United States Patent [19]

Setiabudi et al.

[11] Patent Number: 5,214,098
[45] Date of Patent: May 25, 1993

[54] HARDENABLE EPOXIDE RESIN MIXTURES CONTAINING A LATENT HARDENER, AN AMINE AND A THIOL

[75] Inventors: Frans Setiabudi, Bad Krozingen, Fed. Rep. of Germany; Urs Gruber, Arlesheim, Switzerland

[73] Assignee: Ciba-Geigy Corporation, Ardsley, N.Y.

[21] Appl. No.: 614,805

[22] Filed: Nov. 16, 1990

[30] Foreign Application Priority Data

Nov. 21, 1989 [CH] Switzerland .................. 4170/89

[51] Int. Cl.⁵ .................. C08G 59/40; C08G 65/00
[52] U.S. Cl. .................. 525/109; 525/484;
525/504; 525/523; 525/526; 525/533; 528/90;
528/93; 528/94; 528/99; 528/109; 528/361;
528/374; 523/445; 523/447; 523/466; 523/468;
428/413
[58] Field of Search ............ 525/109, 484, 504, 523,
525/526, 533; 528/93, 94, 109, 361, 374, 99, 90;
523/445, 466, 468, 447; 428/413

[56] References Cited

U.S. PATENT DOCUMENTS

| | | | |
|---|---|---|---|
| 3,030,247 | 4/1962 | Schurb | 528/118 |
| 3,278,496 | 10/1966 | LeFave et al. | 528/109 |
| 3,310,527 | 3/1967 | Acetis et al. | 528/109 |
| 3,352,810 | 11/1967 | McLay et al. | 528/109 |
| 3,363,026 | 1/1968 | Schroll | 528/109 |
| 3,386,955 | 6/1968 | Chrobok et al. | 528/119 |
| 3,677,978 | 7/1972 | Dowbenko et al. | 528/94 |
| 3,678,007 | 7/1972 | Dowbenko et al. | 528/94 |
| 3,716,588 | 2/1973 | Esclamadon et al. | 528/109 |
| 3,718,700 | 2/1973 | Esclamadon et al. | 528/109 |
| 3,732,309 | 5/1973 | Garnish et al. | 528/109 |
| 3,734,968 | 5/1973 | Hickner et al. | 528/109 |
| 4,092,293 | 5/1978 | Harris et al. | 528/109 |
| 4,126,505 | 11/1978 | Garnish et al. | 156/330 |
| 4,283,520 | 8/1981 | Moser et al. | 528/93 |
| 4,436,892 | 3/1984 | Zondler et al. | 528/117 |
| 4,529,821 | 7/1985 | Stockinger et al. | 564/105 |
| 4,550,203 | 10/1985 | Stockinger et al. | 564/105 |
| 4,587,311 | 5/1986 | Schmid et al. | 525/504 |
| 4,618,712 | 10/1986 | Stockinger et al. | 564/103 |
| 4,694,096 | 9/1987 | Lehmann et al. | 558/251 |
| 4,859,761 | 8/1989 | Flury et al. | 528/123 |
| 4,879,414 | 11/1989 | Johnson et al. | 564/388 |
| 4,927,902 | 5/1990 | Johnson et al. | 528/99 |
| 4,990,679 | 2/1991 | Wolf et al. | 568/62 |

FOREIGN PATENT DOCUMENTS 59-129221 7/1984 Japan.
1350156 4/1974 United Kingdom.

Primary Examiner—John C. Bleutge
Assistant Examiner—Frederick Krass
Attorney, Agent, or Firm—Luther A. R. Hall

[57] ABSTRACT

Hardenable mixtures comprising (a) an epoxide resin, (b) a latent epoxide resin hardener which starts to react only at a temperature of at least 80° C. (measured by DSC at a heating rate of 10° C./minute), (c) an amine having at least one amine hydrogen and (d) a thiol having at least one SH group, either the amine (c) having at least two hydrogen atoms bound to one or more nitrogen atoms or the thiol (d) having at least two SH groups, and the difference between the reaction maxima in the DSC diagram at a heating rate of 10° C./minutes being at least 30° C., are suitable for the production of crosslinked products, especially for the production of flexible prepregs having a non-critical B stage and a very good storability.

16 Claims, No Drawings

HARDENABLE EPOXIDE RESIN MIXTURES CONTAINING A LATENT HARDENER, AN AMINE AND A THIOL

The invention relates to hardenable mixtures containing an epoxide resin and certain latent hardeners, amines and thiols, and to the crosslinked products prepared therefrom, in particular prepregs and laminates.

For the production of prepregs based on epoxide resins without the use of solvents, mixtures of low-viscosity, liquid and high-viscosity to solid epoxide resins are used in general. To be able to convert these into slightly tacky to dry prepregs, they must be partially pre-reacted with hardeners under extremely strictly controlled conditions. This is usually termed the formation of the so-called B stage. In general, at least two hardeners of different reactivity are used. In the existing methods, the hardeners used do not show sufficient difference in reactivity so that, after the pre-reaction with the hardener reacting at the lower temperature (reaching of the B stage), the crosslinking undesirably progresses further even at room temperature, and the prepregs thus have only a very limited storage stability. Such prepregs also do not meet current requirements with respect to flexibility and tackiness. As experience shows, it is very difficult to reproduce the formation of the B stage exactly, and this leads to undesired quality fluctuations, for example with respect to tackiness, flexibility and storage stability of the prepregs.

An epoxide resin binder has now been developed which does not show the disadvantages described. The novel epoxide resin mixture is distinguished by a complete separation of the B stage hardener reactivity from the C stage, so that the stability of the B stage and hence also the storage stability of the prepregs can be extended from a few days to several months. In addition, as a consequence of the amine/thiol hardener mixture used for producing the B stage, the prepregs show increased flexibility, which can be adjusted to almost any desired value by a suitable choice of the amine and of the thiol.

The invention relates to hardenable mixtures, comprising (a) an epoxide resin, (b) a latent epoxide resin hardener which starts to react only at a temperature of at least 80° C. (measured by DSC at a heating rate of 10° C./minute), (c) an amine having at least one amine hydrogen and (d) a thiol having at least one SH group, either the amine (c) having at least two hydrogen atoms bound to one or more nitrogen atoms or the thiol (d) having at least two SH groups, and the difference between the reaction maxima in the DSC diagram at a heating rate of 10° C./minute being at least 30° C.

When such mixtures are heated in a DSC apparatus (DSC=differential scanning calorimeter), the DSC diagram (enthalpy of reaction as a function of the temperature) shows two pronounced maxima and a clear base line separation. The first reaction maximum is to be ascribed to the reaction of the resin with the amine/thiol mixture (B stage) and is located, depending on the selected composition, for example in the range from about 80° to about 130° C. The second maximum results from the crosslinking by the latent hardener and is located, for example, in the range from about 100 to 200, preferably about 130° to 180° C.

The greater the temperature difference between the two reaction maxima, the higher is the storage stability of the prepregs produced using the mixture. Mixtures in which the difference between the reaction maxima is at least 40° C., in particular at least 50° C., are therefore preferred.

British Patent Specification 1,350,156 describes the advancing of epoxide resins with compounds, which contain OH groups or SH groups, in the presence of certain boron trifluoride/amine complexes. The advanced resins are crosslinked by means of the conventional hardeners for epoxide resins, for example amines, anhydrides or catalytic hardeners, and used as casting resins, adhesives or sealing compounds.

In principle, any compound useful in epoxide resin technology can be used as the epoxide resin (a) of the mixtures according to the invention.

Examples of epoxide resins are:

I) Polyglycidyl esters and poly-($\beta$-methylglycidyl) esters, obtainable by reacting a compound having at least two carboxyl groups in the molecule and epichlorohydrin or $\beta$-methyl-epichlorohydrin respectively. The reaction is appropriately carried out in the presence of bases.

Aliphatic polycarboxylic acids can be used as the compound having at least two carboxyl groups in the molecule. Examples of these polycarboxylic acids are oxalic acid, succinic acid, glutaric acid, adipic acid, pimelic acid, suberic acid, azelaic acid or dimerized or trimerized linoleic acid.

However, cycloaliphatic polycarboxylic acids can also be used, for example tetrahydrophthalic acid, 4-methyltetrahydrophthalic acid, hexahydrophthalic acid or 4-methylhexahydrophthalic acid.

Furthermore, aromatic polycarboxylic acids can be used, for example phthalic acid, isophthalic acid or terephthalic acid.

II) Polyglycidyl ethers or poly-($\beta$-methylglycidyl) ethers, obtainable by reacting a compound having at least two free alcoholic hydroxyl groups and/or phenolic hydroxyl groups and epichlorohydrin or $\beta$-methylepichlorohydrin under alkaline conditions, or in the presence of an acid catalyst and subsequent alkali treatment.

Ethers of this type are derived, for example, from acyclic alcohols such as ethylene glycol, diethylene glycol and higher poly-(oxyethylene) glycols, propane-1,2-diol or poly-(oxypropylene) glycols, propane-1,3-diol, butane-1,4-diol, poly-(oxytetramethylene) glycols, pentane-1,5-diol, hexane-1,6-diol, hexane-2,4,6-triol, glycerol, 1,1,1-trimethylolpropane, pentaerythritol, sorbitol and also from polyepichlorohydrins.

However, they are also derived from, for example, cycloaliphatic alcohols such as 1,4-cyclohexanedimethanol, bis-(4-hydroxycyclohexyl)-methane or 2,2-bis-(4-hydroxycyclohexyl)-propane, or they possess aromatic nuclei, such as N,N-bis-(2-hydroxyethyl)-aniline or p,p'-bis-(2-hydroxyethylamino)-diphenylmethane.

The epoxide compounds can also be derived from mononuclear phenols, for example from resorcinol or hydroquinone; or they are based on polynuclear phenols, for example bis-(4-hydroxyphenyl)-methane, 4,4'-dihydroxybiphenyl, bis-(4-hydroxyphenyl)-sulfone, 1,1,2,2-tetrakis-(4-hydroxyphenyl)-ethane, 2,2-bis-(4-hydroxyphenyl)-propane, 2,2-bis-(3,5-dibromo-4-hydroxyphenyl)-propane and on novolaks obtainable by condensation of aldehydes, such as formaldehyde, acetaldehyde, chloral or furfural, with phenols such as phenol, or with phenols which are substituted in the nucleus by chlorine atoms or $C_1$–$C_9$alkyl groups, for example 4-chlorophenol, 2-methylphenol or 4-tert-butylphenol, or by condensation with bisphenols as described above.

III) Poly-(N-glycidyl) compounds obtainable by dehydrochlorination of the reaction products of epichlorohydrin with amines containing at least two amine hydrogen atoms. Examples of these amines are aniline, n-butylamine, bis-(4-aminophenyl)-methane, m-xylylenediamine or bis-(4-methylaminophenyl)-methane.

The poly-(N-glycidyl) compounds, however, also include triglycidyl isocyanurate, N,N'-diglycidyl derivatives of cycloalkyleneureas, such as ethyleneurea or 1,3-propyleneurea, and diglycidyl derivatives of hydantoins such as 5,5-dimethylhydantoin.

IV) Poly-(S-glycidyl) compounds, for example di-S-glycidyl derivatives which are derived from dithiols, for example ethane-1,2-dithiol or bis-(4-mercaptomethylphenyl) ether.

V) Cycloaliphatic epoxide resins, for example bis-(2,3-epoxycyclopentyl) ether, 2,3-epoxycyclopentyl glycidyl ether, 1,2-bis-(2,3-epoxycyclopentyloxy)-ethane or 3,4-epoxycyclohexylmethyl 3',4'-epoxycyclohexanecarboxylate.

However, epoxide resins can also be used in which the 1,2-epoxide groups are bound to different heteroatoms or functional groups; these compounds include, for example, the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis-(5,5-dimethyl-1-glycidylhydantoin-3-yl)-propane.

Those epoxide resins having an epoxide content of 2 to 10 equivalents/kg are preferred which are glycidyl ethers, glycidyl esters or N-glycidyl derivatives of aromatic, heterocyclic, cycloaliphatic or aliphatic compounds.

Particularly preferred epoxide resins are polyglycidyl ethers of polyhydric phenols, for example of 2,2-bis-(4-hydroxyphenyl)-propane (bisphenol A) or bis-(4-hydroxyphenyl)-methane (bisphenol F), or of novolaks. The epoxide resins used are preferably liquid, i.e. they are either liquid resins or liquid mixtures of solid and liquid resins.

The most preferred epoxide resins are the diglycidyl ethers of bisphenol A or bisphenol F, epoxy cresol novolaks or 4,4'-diaminodiphenylmethane tetraglycidyl derivatives.

The latent hardener (b) used can in principle be any compound known for this purpose, which meets the definition according to the invention, i.e. any compound which is inert towards the epoxide resin below the defined limit temperature of 80° C. but reacts rapidly with crosslinking of the resin as soon as this limit temperature is exceeded. The limit temperature of the latent hardeners used according to the invention is preferably at least 85° C., especially at least 100° C. Such compounds are well-known and also commercially available.

Examples of suitable latent hardeners are dicyandiamide, cyanoguanidines, for example the compounds described in U.S. Pat. No. 4,859,761 or EP-A 306,451, aromatic amines, for example 4,4'-or 3,3'-diaminodiphenyl sulfone, or guanidines, for example 1-o-tolylbiguanide, or modified polyamines, for example Ancamine ®2014 S (Anchor Chemical UK Limited, Manchester).

Suitable latent hardeners are also N-acylimidazoles, for example 1-(2',4',6'-trimethylbenzoyl)-2-phenylimidazole or 1-benzoyl-2-isopropylimidazole. Such compounds are described, for example, in U.S. Pat. Nos. 4,436,892 and 4,587,311 or Japanese Patent 743,212.

Further suitable hardeners are metal salt complexes of imidazoles, such as are described in U.S. Pat. Nos. 3,678,007 or 3,677,978, carboxylic acid hydrazides, for example adipic acid dihydrazide, isophthalic acid dihydrazide or anthranilic acid hydrazide, triazine derivatives, for example 2-phenyl-4,6-diamino-s-triazine (benzoguanamine) or 2-lauryl-4,6-diamino-s-triazine (lauroguanamine) and also melamine and derivatives thereof. The last-mentioned compounds are described, for example, in U.S. Pat. No. 3,030,247.

Suitable latent hardeners are also cyanoacetyl compounds, such as are described in U.S. Pat. No. 4,283,520, for example neopentyl glycol bis-cyanoacetate, cyanoacetic acid N-isobutylamide, 1,6-hexamethylene bis-cyanoacetate or 1,4-cyclohexanedimethanol bis-cyanoacetate.

N-Cyanoacylamide compounds, for example N,N'-dicyanoadipic acid diamide are also suitable latent hardeners. Such compounds are described, for example, in U.S. Pat. Nos. 4,529,821, 4,550,203 and 4,618,712.

Further suitable latent hardeners are the acylthiopropylphenols described in U.S. Pat. No. 4,694,096 and the urea derivatives disclosed in U.S. Pat. No. 3,386,955, for example toluene-2,4-bis-(N,N-dimethylcarbamide).

The preferred latent hardeners are 4,4'-diaminodiphenyl sulfone and especially dicyandiamide.

If appropriate, the mixtures according to the invention can also contain accelerators (e) for the crosslinking reaction with the latent hardener. Examples of suitable accelerators (e) are urea derivatives such as N,N-dimethyl-N'-(3-chloro-4-methylphenyl)-urea (chlorotoluron), N,N-dimethyl-N'-(4-chlorophenyl)-urea (monouron) or N,N-dimethyl-N'-(3,4-dichlorophenyl)-urea (diuron), 2,4-bis-(N',N'-dimethylureido)-toluene or 1,4-bis-(N',N'-dimethylureido)-benzene. The use of these compounds is described, for example, in the abovementioned U.S. Pat. No. 4,283,520. The urea derivatives described in British Patent 1,192,790 are, for example, also suitable as accelerators.

Imidazoles, for example imidazole, 2-ethylimidazole, 2-phenylimidazole, 1-methylimidazole, 1-cyanoethyl-2-ethyl-4-methylimidazole or 2-ethyl-4-methylimidazole, are also suitable accelerators.

Further suitable accelerators are also tertiary amines, salts thereof or quaternary ammonium compounds, such as benzyldimethylamine, 2,4,6-tris-(dimethylaminomethyl)-phenol, 4-aminopyridine, tripentylammonium phenolate, tetramethylammonium chloride or benzyltributylammonium bromide or chloride; or alkali metal alcoholates, such as Na alcoholates of 2,4-dihydroxy-3-hydroxymethylpentane.

The solid solutions, described in EP-A 200,678, of a nitrogen base and a phenol/aldehyde resin, and the Mannich bases of polymeric phenols as disclosed in EP-A 351,365, are likewise suitable as accelerators.

The preferred accelerators (e) are imidazoles or urea derivatives. The amine component (c) of the mixtures according to the invention can, as mentioned, be any amine having at least one amine hydrogen. In order to obtain good results, however, either the amine (c) or the thiol (d) must contain at least three hydrogen atoms active towards the epoxide resin. In the case of the amine (c), these must be bound to at least two nitrogen atoms. As long as this condition is met, any amine can in principle be used. The amines can contain one or more primary, secondary or tertiary nitrogen atoms.

Examples of suitable amines (c) are aliphatic, cycloaliphatic, aromatic and heterocyclic amines, such as bis-(4-aminophenyl)-methane, aniline/formaldehyde resins, benzylamine, n-octylamine, propane-1,3-diamine, 2,2-dimethyl-1,3-propanediamine (neopentanediamine), hexamethylenediamine, diethylenetriamine, bis-(3-aminopropyl)-amine, N,N-bis-(3-aminopropyl)-methylamine, triethylenetetramine, tetraethylenepentamine, pentaethylenehexamine, 2,2,4-trimethylhexane-1,6-diamine, m-xylylenediamine, 1,2-and 1,4-diaminocyclohexane, bis-(4-aminocyclohexyl)-methane, bis-(4-amino-3-methylcyclohexyl)-methane, 2,2-bis-(4-aminocyclohexyl)-propane and 3-aminomethyl-3,5,5-trimethylcyclohexylamine (isophoronediamine), polyaminoimidazolines and polyaminoamides, for example those obtained from aliphatic polyamines and dimerized or trimerized fatty acids. Suitable amines (c) are also the polyoxyalkyleneamines, known as Jeffamines®, made by Texaco, for example the Jeffamines® EDR 148, D 230, D 400 or T 403.

Further suitable amines are 1,14-diamino-4,11-dioxatetradecane, dipropylenetriamine, 2-methyl-1,5-pentanediamine, N,N'-dicyclohexyl-1,6-hexanediamine, N,N'-dimethyl-1,3-diaminopropane, N,N'-diethyl-1,3-diaminopropane, N,N-dimethyl-1,3-diaminopropane, secondary polyoxypropylene-diamines and -triamines, for example the Texaco products EPS 7315 and EPS 7325, 2,5-diamino-2,5-dimethylhexane, bis-(aminomethyl)-tricyclopentadiene, m-aminobenzylamine, 1,8-diamino-p-menthane, bis-(4-amino-3,5-dimethylcyclohexyl)-methane, 1,3-bis-(aminomethyl)-cyclohexane, dipentylamine, bis-(4-amino-3,5-diethylphenyl)-methane, 3,5-diethyltoluene-2,4-diamine and 3,5-diethyltoluene-2,6-diamine.

If cycloaliphatic or aliphatic amines are used, it is preferable not to employ glycidyl esters as the resin components.

The amines (c) used have preferably at least one and especially at least two NH2 groups. Cycloaliphatic or aliphatic amines are preferred components (c) of the mixtures according to the invention. 1,2-Diaminocyclohexane, 3-aminomethyl-3,5,5-trimethylcyclohexylamine (isophoronediamine), bis-(4-aminocyclohexyl)-methane and polyaminoimidazolines, for example the polyaminoimidazoline marketed as Eurodur® 370 by Schering AG, are particularly preferred among the cycloaliphatic amines. Compounds of the formulae I to VI

H$_2$N—R—NH$_2$,  (I)

H$_2$N(CH$_2$CH$_2$O)$_a$CH$_2$CH$_2$NH$_2$,  (II)

H$_2$NCHCH$_2$(OCH$_2$CH)$_{\overline{b}}$NH$_2$,  (III)
|    |
CH$_3$  CH$_3$

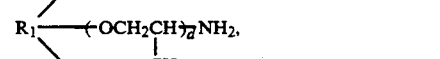
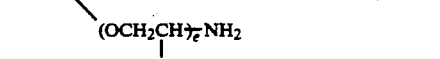

H$_2$N(CH$_2$CH$_2$CH$_2$NH)$_f$CH$_2$CH$_2$CH$_2$NH$_2$,  (V)

H$_2$N(CH$_2$CH$_2$NH)$_g$CH$_2$CH$_2$NH$_2$,  (VI)

in which R is a straight-chain or branched C$_2$–C$_{10}$alkylene radical, a is an integer from 1 to 10, preferably 2, b is an integer from 1 to 10, preferably 2 to 6, c, d and e independently of one another are an integer from 1 to 20, preferably 2 to 5, f is an integer from 1 to 5, preferably 1, and g is an integer from 1 to 10, preferably 1 to 5, and R$_1$ is a trivalent radical of the formulae

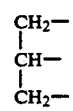

or especially

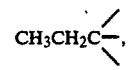

are preferred among the aliphatic amines (c).

2,2,4-Trimethylhexane-1,6-diamine, Jeffamine® EDR 148 of the formula II where a = 2, Jeffamine® D 230 or D 400 of the formula III with b=2-3 or b=5-6 respectively, Jeffamine® T 403 of the formula IV, bis-(3-aminopropyl)-amine, diethylenetriamine, triethylenetetramine, 2,2-dimethyl-1,3-propanediamine and pentaethylenehexamine are very particularly preferred.

The most preferred amines are n-octylamine, 4,4'-diaminodicyclohexylmethane, Jeffamine® EDR 148, Laromin® C-260 (BASF,3,3'-dimethyl-4,4'-diaminodicyclohexylmethane), 1,2-diaminocyclohexane and isophoronediamine.

The amines (c) together with the thiols (d) act as hardeners in the first stage of crosslinking. The thiol (d) used can in general be any suitable compound having at least one and preferably two or three SH groups. Examples of suitable thiols (d) are triglycol dimercaptan or 1,2-bis-(2'-mercaptoethoxy)-ethane, the polymeric polysulfides, known under the name Thiokols®, of the formula HS(CH$_2$CH$_2$OCH$_2$OCH$_2$CH$_2$SS)$_n$CH$_2$CH$_2$OCH$_2$OCH$_2$CH$_2$SH, trimethylolpropane trithioglycolate and further thioglycolates, for example the compounds described in U.S. Pat. No. 3,352,810, aliphatic and cycloaliphatic dithiols of the type described in U.S. Pat. Nos. 3,716,588, 3,734,968, 3,718,700 and 3,278,496, poly-(mercaptoalkyl)-aromatics such as are described in U.S. Pat. No. 3,310,527, alkylenedithiols or hydroxyalkylenedithiols of the type described in U.S. Pat. No. 3,363,026, dipentaerythritol hexa-(3-mercaptopropionate), monothiols such as cetylthiol, benzylthiol, pentylthiol, hexylthiol, octylthiol or decylthiol, or trithiols such as 2,4,6-s-triazinetrithiol.

The preferred thiols (d) are polyoxyalkylene derivatives, especially polyoxyalkylene-dithiols or -trithiols.

These can, for example, be polyethylene glycol derivatives, polypropylene glycol derivatives or also copolymers containing oxyethylene units and oxypropylene units. The copolymers can be block polymers or random polymers. The corresponding block polymers are sometimes also called polypropylene glycol ethoxylate or polyethylene glycol propoxylate, depending on whether they have terminal polyethylene glycol blocks or polypropylene glycol blocks. The commercially available polypropylene glycols predominantly have secondary terminal hydroxyl groups; it is to be understood, of course, that polypropylenedithiols having primary thiol groups can also be used.

Further suitable dithiols are derived from polytetrahydrofurandiols. Polytetrahydrofurandiols are known and also commercially available. Examples of such products are Poly-THF 650 ®, Poly-THF 1000 ® and Poly-THF 2000 ® from BASF. These commercially available diols can, for example by reaction with thionyl chloride, be converted to a dichloro derivative which is reacted with thiourea to give the corresponding isothiuronium chloride and this product is then hydrolysed to the dithiol. The conversion of alcohols to thiols, as explained, is described, for example, in Organic Synthesis, Collective Volume 3, pages 698–700 and Collective Volume 4, pages 401–403, Wiley, N.Y., 1955 and 1963 respectively.

Suitable thiols (d) are also the polyoxyalkylene derivatives marketed under the description CapCure ® (Henkel Napco AG), for example CapCure ® WR-6 or WR-36, especially CapCure ® 3-800 of the formula

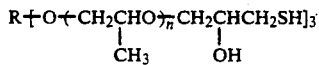

with n=1-2 and R being a trivalent radical of an aliphatic hydrocarbon.

Particularly suitable dithiols are compounds of the formulae HS(CH$_2$CH$_2$O)$_{7-8}$CH$_2$CH$_2$SH and HS(CH$_2$CH$_2$CH$_2$CH$_2$O)$_m$CH$_2$CH$_2$CH$_2$CH$_2$SH with m=7-8, 12-13 or 26-27.

Triglycol dimercaptan, CapCure ® 3-800 and trimethylolpropane trithioglycolate are most preferred.

If appropriate, the mixtures according to the invention can also contain accelerators for the amine/thiol hardening, for example phenols, such as nonylphenol or resorcinol, or organic acids such as p-toluenesulfonic acid.

The quantitative ratios of the components of the mixtures according to the invention can vary widely depending on the specific composition. Suitable quantities of the latent hardener are, for example, in the range from about 3 to 60 and preferably about 6 to 30 parts by weight per 100 parts by weight of the epoxide resin.

Those mixtures are in general preferred in which about 5–50%, especially about 10–35%, of the epoxide groups of the resin are crosslinked by the amine/thiol mixture when producing the B stage, and the remaining epoxide groups are hardened by the latent hardener.

The NH groups/SH groups equivalent ratio can also vary widely, depending on the type of thiol or amine used and depending on the desired properties of the B stage. For example, NH/SH equivalent ratios from about 15:1 to about 1:6, preferably from about 10:1 to about 1:3, have proved suitable.

The quantities of the components (c) and (d) used will also depend on the intended application, i.e. on the desired flexibility of the B stage and on the desired use life of the mixture. In general, both the flexibility and the use life increase with an increase in the relative quantities of the thiol/amine mixture.

The quantities of the accelerator (e), which may be added for the hardening by the latent hardener (b) or of the accelerator for the hardening by the amine (c) and the thiol (d) are known to those skilled in the art for any type of accelerator.

Examples of suitable quantities of the individual components of the mixtures according to the invention can be seen from the compositions in the illustrative examples.

The mixtures according to the invention can also be processed from a solution, for example in methyl ethyl ketone, in which case the temperatures for the B stage hardening and the C stage hardening do not change.

If desired, reactive diluents, for example butanediol diglycidyl ether, monoglycidyl ethers of isomeric higher alcohols, for example Grilonit RV 1814 ® made by Ems-Chemie, or butyl glycidyl ether, 2,2,4-trimethylpentyl glycidyl ether, phenyl glycidyl ether, cresyl glycidyl ether or glycidyl ester, can be added to the hardenable mixtures to reduce the viscosity.

The mixtures according to the invention can also contain adhesion promoters. Any known adhesion promoter can in principle be used. Silanes, for example γ-glycidyloxypropyltrimethoxysilane (silane A-187 made by Union Carbide) or γ-mercaptopropyltrimethoxysilane (silane A-189 made by Union Carbide) or titanium compounds such as tetraisopropyl bis-(dioctylphosphonato)-titanate (KR 41B made by Kenrich Petrochemicals Inc., USA) have proved to be particularly suitable adhesion promoters.

As further conventional additives, the mixtures according to the invention can also contain extenders, fillers and reinforcing agents, for example bituminous coal tar, bitumen, textile fibres, glass fibres, asbestos fibres, boron fibers, carbon fibres, mineral silicates, mica, quartz powder, hydrated alumina, bentonites, wollastonite, kaolin, silica aerogel or metal powders, for example aluminium powder or iron powder, and also pigments and dyes, such as carbon black, oxide pigments and titanium dioxide, flameproofing agents, thixotropic agents, flow control agents such as silicones, waxes and stearates, some of which are also used as mould-release agents, antioxidants and light stabilizers.

The mixtures according to the invention can be prepared in the conventional manner by mixing the components by means of known mixing equipment (stirrers, rollers).

The mixtures according to the invention can be used, for example, as adhesives (adhesive films, hot melts, pastes, one-component adhesives, patches), matrix resins, surface coatings, sealing compounds or injection compounds, or quite generally for the manufacture of hardened products. They can be used in each case in a formulation adapted to the specific field of application, in the unfilled or filled state, for example as sealing compounds, paints, coating compositions, finishes, dipping resins, casting resins and especially as impregnating resins, laminating resins, matrix resins and adhesives.

The invention therefore also relates to crosslinked products which are obtainable by hardening the mixtures according to the invention.

The hardening of the mixtures is preferably carried out in the temperature range from about 80°–180° C. The hardening reaction with the amine/thiol hardener is complete after, for example, about 2–10 minutes at 90°–120° C., and a storage-stable, non-critical B stage system is obtained which shows excellent flexibility and tackiness. The complete crosslinking with shaping is preferably carried out at about 100°–180° C. for about 20–60 minutes.

The crosslinked systems have excellent mechanical and thermal properties, even if the complete hardening is carried out only after prolonged storage (several weeks to months) of the hardenable mixtures or of the B stage.

As mentioned, the mixtures according to the invention are especially suitable as impregnating resins for the production of fibre composite materials. The invention therefore also relates to fibre composite materials impregnated with a mixture according to the invention, to prepregs obtainable by impregnating a fabric with a mixture and subsequent heating of the impregnated fabric until the reaction of the epoxide resin (a) with the amine (c) and the thiol (d) is complete, without simultaneous onset of the reaction of the epoxide resin (a) with the latent hardener (b), and also to the laminates obtainable by complete hardening of the prepregs.

Furthermore, the mixtures according to the invention can be used as adhesives, especially hot-melt reactive adhesives and adhesive films. After the B stage formation at a temperature from 25° to 50° C. storage-stable adhesive pastes are obtained which can be processed with or without addition of fillers. The viscosity of the adhesive can be varied arbitrarily by way of the degree of B stage.

The examples which follow illustrate the invention.

EXAMPLES 1–11

The following components are used in the compositions defined in Table 1:

Epoxide resin 1: A bisphenol A diglycidyl ether having an epoxide equivalent weight of 186.2 g.

Epoxide resin 2: An epoxy cresol novolak having an epoxide equivalent weight of 235 g.

Epoxide resin 3: A solid bisphenol A resin having an epoxide equivalent weight of 380 g.

Latent hardener 1: A mixture of 25.5 parts by weight of dicyandiamide, 12.5 parts by weight of chlorotoluron [(N,N-dimethyl-N'-(3-chloro-4-methylphenyl)-urea], 46.5 parts by weight of bisphenol A diglycidyl ether having an epoxide equivalent weight of 192.3 g and 15.5 parts by weight of bisphenol A diglycidyl ether having an epoxide equivalent weight of 222.2 g.

Latent hardener 2: A mixture of 28 parts by weight of dicyandiamide and 72 parts by weight of bisphenol A diglycidyl ether having an epoxide equivalent weight of 192.3 g.

Latent hardener 3: 4,4'-Diaminodiphenyl sulfone.

The compositions are prepared by mixing all the constituents, if necessary with slight heating.

Preparation of prepregs (PP) and laminates: A glass fabric made by Interglas (92146-I-550) (43×25 cm) is impregnated on a sheet with the binder mixture at 50° C. For removal of the air and optimum distribution of the binder, a glass rod is rolled across the prepreg. To reach the B stage, each of the prepregs is heated on a hot-plate at 90°–120° C. for 2–10 minutes (cf. Table 2). For producing laminates, the prepreg is cut into parts of equal size (6.5×9.9 cm). The sheets are removed, twelve prepreg plies are superposed and in this form pressed in a mould on the press under a maximum of 5 MPa and hardened at the appropriate temperature. The thickness of the laminate is 3–3.3 mm. The test specimens for measurements of the interlaminar shear strength (cf. Table 3) are cut out of the laminate thus produced.

The gelling time at 50° C. (cf. Table 3) is determined by means of a Techne Gelation Timer GT 3 made by Techne Ltd., Cambridge, UK. The gelling time at 120° C. (cf. Table 4) is determined on a gelling time hot-plate with an automatic system. A wire strap (diameter 0.4 mm) is here drawn through the substance until the latter has reached a defined solidity.

The viscosity is determined by means of an ICI cone-and-plate viscometer made by Epprecht Instruments, Dottikon, Switzerland.

The DSC and Tg measurements are carried out by means of a Mettler TA 3000 thermoanalytic system.

TABLE 1

Constituents of the compositions and their thermal behaviour

| | Example No. | | | | |
|---|---|---|---|---|---|
| | 1 | 2 | 3 | 4 | 5 |
| Epoxide resin 1 (g) | 70 | 70 | 80 | 80 | 80 |
| Epoxide resin 2 (g) | 30 | 30 | | | |
| Epoxide resin 3 (g) | | | 20 | 20 | 20 |
| Latent hardener 1 (g) | 37.3 | 31.5 | 34.8 | 33.8 | 33.3 |
| n-Octylamine (g) | 2.5 | | | | |
| Isophoronediamine (g) | | 2.63 | | | |
| 4,4'-Diamino-dicyclo-hexylmethane (g) | | | 2.9 | | |
| Jeffamine ® EDR-148[1] (g) | | | | 2.4 | |
| 1,2-Diaminocyclohexane (g) | | | | | 2.1 |
| Triglycol dimercaptan (g) | | 5,6 | | | |
| CapCure ® 3-800[2] (g) | 4.3 | | 2.82 | 2.8 | 2.8 |
| B Stage max (°C.)[3] | 94 | 102 | 85 | 93 | 91 |
| C Stage max (°C.)[3] | 146 | 147 | 147 | 146 | 146 |

| | Example No. | | | | | |
|---|---|---|---|---|---|---|
| | 6 | 7 | 8 | 9 | 10 | 11 |
| Epoxide resin 1 (g) | 100 | 100 | 100 | 100 | 70 | 100 |
| Epoxide resin 2 (g) | | | | | 30 | |
| Latent hardener 1 (g) | | | | | | 35.1 |
| Latent hardener 2 (g) | 38 | | | | | |
| Latent hardener 3 (g) | | 32.9 | | 27.4 | 6 | |
| 2,4-Bis-(N',N'-dimethyl- | | | 6 | | | |

TABLE 1-continued

| Constituents of the compositions and their thermal behaviour | | | | | | |
|---|---|---|---|---|---|---|
| ureido)-toluene (g) | | | | | | |
| 1,4-Bis(N',N'-dimethyl-ureido)-benzene (g) | | | | | 6 | |
| 1-Benzoyl-2-isopropyl-imidazole (g) | 2.3 | | | | | |
| 1-(2',4',6'-Trimethylbenzo-yl)-2-phenylimidazole (g) | | | | 3 | | |
| 1-Cyanoethyl-2-ethyl-4-methylimidazole (g) | | 1.7 | | | | |
| Isophoronediamine (g) | 2.1 | 2.3 | 2 | 2.75 | 2 | 2.33 |
| CapCure ® 3-800 | | 5.4 | | | | |
| Triglycol dimercaptan | 5.8 | | 7 | 4 | 7 | |
| Trimethylolpropane tri-thioglycolate | | | | | | 7.3 |
| B Stage max (°C.) | 68 | 86 | 102 | 128 | 127 | 97 |
| C Stage max (°C.) | 133 | 143 | 151 | 162 | 171 | 159 |

[1] $H_2N(CH_2CH_2O)_2CH_2CH_2NH_2$ made by Texaco

[2] 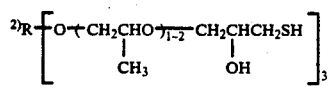

made by Henkel Napco Ag
[3] Determined by DSC (on a Mettler TA 3000; heating rate 10° C./min)

TABLE 2

Room temperature stability of the prepregs (PP)

| Composition from Example No. | PP preparation[1] Minutes/°C. | Tackiness up to x days | | | Flexibility up to x days | |
|---|---|---|---|---|---|---|
| | | high | medium | low | very good | good |
| 1 | 10/100 | 11 | 15 | 16 | 11 | 15 |
| 2 | 10/100 | — | 30 | 45 | 48 | 58 |
| | 5/110 | — | 30 | 45 | 45 | 50 |
| | 3/120 | — | 30 | 45 | 40 | 45 |
| 3 | 5/110 | 17 | 24 | 30 | 20 | 30 |
| 4 | 5/110 | 14 | 19 | 22 | 14 | 22 |
| 5 | 5/110 | 10 | 20 | 22 | 14 | 22 |
| 6 | 5/110 | 7 | 10 | 14 | 7 | 12 |
| 7 | 5/90 | 3 | 6 | 7 | 3 | 7 |
| 8 | 5/100 | 1 | 7 | 18 | 7 | 18 |
| 9 | 5/110 | 5 | 20 | 26 | 20 | 26 |
| | 4/120 | 5 | 12 | 18 | 12 | 18 |
| 10 | 5/100 } 3/120 | — | 10 | 16 | 10 | 16 |
| 11 | 5/110 | 24 | 50 | 56 | 30 | 50 |

[1] The prepregs are prepared by heating the impregnated fabric for the indicated time and at the indicated temperature.

TABLE 3

Properties of the compositions and of the hardened products

| Composition from Example No. | Flexural test[1] (DIN 53 452) | | | $T_g$[2] (°C.) | ILS (ASTM-D-2344)[3] | | | Gelling time[4] at 50° C. (hours) | Viscosity[5] at 55° C. (mPa.s) |
|---|---|---|---|---|---|---|---|---|---|
| | Modulus of elasticity (N/mm²) | Strength (N/mm²) | Outer fiber strain (%) | | A (N/mm²) | B (N/mm²) | PP age (Days) | | |
| 1 | 3473 | 143 | 4.7 | 115 | 68.2 | 66.0 | 3 | 54 | 5000 |
| | | | | | 72.0 | 69.7 | 13 | | |
| 2 | 3424 | 131 | 4.3 | 114 | 70.3 | 67.3 | 3 | 13.5 | 5600 |
| | | | | | 69.3 | 68.0 | 14 | | |
| 3 | 3191 | 116 | 4.6 | 114 | 64.0 | 60.8 | 21 | >72 | 1040 |
| 4 | 2947 | 110 | 4.2 | 104 | | | | 70 | 1120 |
| 5 | 3364 | 110 | 3.5 | 119 | 67.3 | 65.6 | 13 | 80 | 1000 |
| 6 | | | | 110 | 66.6 | 65.3 | 12 | 21.3 | 8300 (RT) |
| 7 | 3212 | 81 | 2.5 | 108 | 57.1 | 53.1 | 5 | 9.3 | 1600 |

[1] Determined on mouldings without fabric after hardening at 130° C. for 35 minutes.
[2] $T_g$ onset (Mettler TA 3000) measured after hardening at 130° C. for 35 minutes.
[3] Interlaminar shear strength measured on laminates having a resin content of about 22% by weight, after hardening at 130° C. for 35 minutes; A measured after hardening; B measured after hardening and after 1 hour in boiling water.
[4] Measured by means of the Techne Gleation Time GT 3.
[5] Measured on freshly prepared compositions.

TABLE 4

Gelling time of the compositions at 120° C. as a function of the time for which they were stored at room temperature.

| 1 | | 2 | | 3 | | 4 | | 5 | |
|---|---|---|---|---|---|---|---|---|---|
| Duration of storage | Gelling time [min/sec] | Duration of storage | Gelling time [min/sec] | Duration of storage | Gelling time [min/sec] | Duration of storage | Gelling time [min/sec] | Duration of storage | Gelling time [min/sec] |
| Fresh | 12'46" | Fresh | 12'00" | Fresh | 10'15" | Fresh | 10'20" | Fresh | 11'05" |
| 5 days | 11'11" | 3 days | 14'40" | 5 days | 14'19" | 4 days | 13'31" | 7 days | 14'37" |
| 15 days | 11'53" | 15 days | 15'06" | 16 days | 13'44" | 12 days | 12'41" | 17 days | 14'09" |

TABLE 5

Tensile shear strengths of the adhesives bonds (hardening for 35 minutes at 130° C.) of aluminium sheet strips with prepregs as a function of the time for which the prepregs were stored at room temperature

| Duration of storage | Tensile shear strength (DIN 53 283) | |
|---|---|---|
| | 1 [N/mm²] | 2 [N/mm²] |
| 1 day | 15.1 | 14.2 |
| 5 days | 11.9 | 11.6 |
| 9 days | 13.9 | 14.9 |
| 15 days | 12.1 | 13.2 |

EXAMPLE 12

Determination of the resin flow as a function of the time for which the prepregs were stored The usability of a prepreg is usually determined by reference to its flow. If the flow is too small, for example less than 10%, a prepreg can as a rule no longer be pressed to give a good laminate.

2 square pieces of prepreg (prepared using the composition from Example 2) of 5 cm edge length are weighed (=W 1), accurately superposed and placed between two separating papers into a press preheated to 100° C. The press is closed immediately and pressurized to 2 MPa. After 5 minutes, the laminate thus formed is taken out of the hot press and the resin which has flowed out is cut off along the edge of the laminate. The laminate is weighed again (=W 2). The difference in weight between W 1 and W 2 expressed in % gives the "flow".

| Storage duration of the prepreg at room temperature | Resin flow (% by weight) |
|---|---|
| 1 day | 19.3 |
| 4 days | 21.0 |
| 11 days | 20.8 |

EXAMPLES 13–16

Use of the compositions as hot-melt reactive adhesives

The compositions described in Table 6 are tested after the B stage formation for their storage stability. The viscosities (measured by the Rheomat viscometer made by Contraves AG, Zurich) of the hot melts after various storage times and their thermal and mechanical properties are shown in Table 7, and the tensile shear strengths of the adhesive bonds (hardening for 30 minutes at 160° C.) of aluminum sheet strips are indicated in Table 8.

Accelerator 1: chlorotoluron
Accelerator 2: Imidazoline of the formula

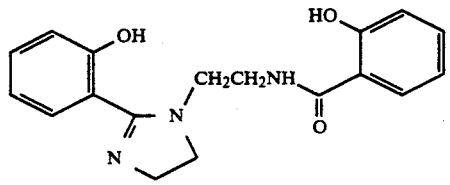

(Example 1 from EP-A 388 359)

Accelerator 3: A solid solution of 2,4,6-tris-(dimethylaminomethyl)-phenol and the phenol/novolak resin M Grade S-2 (Maruzen Petrochemical KK, Tokyo), prepared according to EP-A 200,678 (accelerator VIII)

Accelerator 4: Mannich reaction product from the polyvinylphenol resin M Grade S-2 (Maruzen Petrochemical KK, Tokyo), paraformaldehyde and dimethylamine, prepared according to EP-A 351,365 (accelerator XI)

TABLE 6

Compositions of the hot melts

| Example | 13 | 14 | 15 | 16 |
|---|---|---|---|---|
| Epoxide resin 1 (g) | 10 | 10 | 10 | 10 |
| Dicyandiamide (g) | 1 | 0.3 | 0.96 | 0.96 |
| Accelerator 1 (g) | 0.05 | | | |
| Accelerator 2 (g) | | 1 | | |
| Accelerator 3 (g) | | | 0.04 | |
| Accelerator 4 (g) | | | | 0.04 |
| Isophoronediamine (g) | 0.11 | 0.11 | 0.11 | 0.11 |
| Triethylene glycol dimercaptan (g) | 0.25 | 0.49 | 0.49 | 0.49 |

TABLE 7

Properties of the hot melts

| Example | 13 | 14 | 15 | 16 |
|---|---|---|---|---|
| Viscosity (Pas) after storage at 40° C. | | | | |
| 1 day | 9.3 | 15.5 | 15.3 | |
| 12 days | 13.3 | | | |
| 14 days | | 19.1 | 15.7 | |
| 28 days | | 22.6 | 19.5 | |
| B Stage max. (°C.) | 111.4 | 144.5 | 111.0 | 111.5 |
| C Stage max. (°C.) | 159.9 | 160.5 | 171.5 | 182.5 |
| Gelling time at 140° C. | 10'43" | 13'26" | 13'50" | 27'02" |
| Glass transition temperature $T_g$ after the C stage | 116° C. | 136° C. | 116° C. | 103° C. |

TABLE 8

| Tensile shear strengths of the adhesive bonds (DIN 53 283) after hardening (30 min/160° C.) | | | | |
|---|---|---|---|---|
| Example | 13 | 14 | 15 | 16 |
| Storage | 40 days/RT | 1 day/40° C. | 1 day/40° C. | 1 day/40° C. |
| Tensile shear strength (N/mm$^2$) | 21.1 | 20.9 | 25.8 | 25.7 |

EXAMPLE 17

Use of the compositions as adhesive films

Resin component: 75 g of epoxide resin 1 are heated with stirring to 80°-100° C., and 25 g of finely ground epoxide resin 2 are then added in portions. Stirring is continued at 80°-100° C. until everything is dissolved.

Hardener component: 23.3 g of chlorotoluron, 15.2 g of triethylene glycol dimercaptan and 13.9 g of isophoronediamine are well mixed. 47.6 g of dicyandiamide are added to the resulting suspension and the mixture is dispersed in a dissolver to give a white paste. 100 parts by weight of resin component are mixed with 15 parts by weight of hardener and applied to a nonwoven (Firet 3255 EL made by Lantor BV, Netherlands). After B stage formation (5 minutes at 110° C.), an adhesive film having a resin content of about 80% is obtained.

The tensile shear strength (DIN 53 283) of the adhesive bonds to aluminium sheet strips (hardening for 30 minutes at 129° C.) is 20N/mm$^2$.

What is claimed is:

1. A hardenable mixture, comprising
   (a) an epoxide resin,
   (b) a latent epoxide resin hardener which starts to react only at a temperature of at least 80° C. (measured by DSC at a heating rate of 10° C./minute),
   (c) an amine having at least two NH$_2$ groups which is a cycloaliphatic amine or an aliphatic amine of one of the formulae I to VI $$H_2N-R-NH_2, \quad (I)$$

$$H_2N(CH_2CH_2O)_aCH_2CH_2NH_2, \quad (II)$$

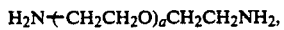  (III)

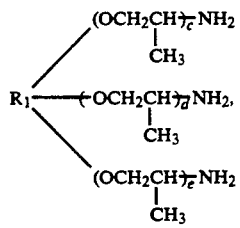  (IV)

$$H_2N(CH_2CH_2CH_2NH)_fCH_2CH_2CH_2NH_2, \quad (V)$$

$$H_2N(CH_2CH_2NH)_gCH_2CH_2NH_2, \quad (VI)$$

in which R is a straight-chain or branched C$_2$-C$_{10}$alkylene radical, a is an integer from 1 to 10, b is an integer from 1 to 10, c,d and e independently of one another are an integer from 1 to 20, f is an integer from 1 to 5, and g is an integer from 1 to 10, and R$_1$ is a trivalent radical of the formulae

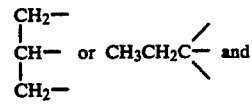 and (d) a thiol having at least one SH group, either the amine (c) having at least two hydrogen atoms bound to one or more nitrogen atoms or the thiol (d) having at least two SH groups, and the difference between the reaction maxima for the amine/thiol and latent hardener reactions with the epoxide resin in the DSC diagram which results upon heating the hardener mixture at a heating rate of 10° C./minute being at least 30° C.

2. A mixture according to claim 1, wherein the difference between the reaction maxima is at least 40° C.

3. A mixture according to claim 1, wherein the epoxide resin (a) is liquid.

4. A mixture according to claim 1, wherein the epoxide resin (a) is a diglycidyl ether of a bisphenol or an epoxy novolak or a poly(N-glycidyl) compound.

5. A mixture according to claim 4, wherein the epoxide resin (a) is a bisphenol A diglycidyl ether, an epoxy cresol novolak or a tetraglycidyl derivative of 4,4'-diaminodiphenylmethane.

6. A mixture according to claim 1, wherein the latent hardener is 4,4'-diaminodiphenyl sulfone or dicyandiamide.

7. A mixture according to claim 1, wherein the thiol (d) contains two or three SH groups.

8. A mixture according to claim 7, wherein the thiol (d) is a polyoxyalkylene-dithiol or -thrithiol.

9. A mixture according to claim 1, which additionally contains an accelerator (e) which is a urea derivative which is N,N-dimethyl-N'-(3-chloro-4-methylphenyl)-urea (chlorotoluron), N,N,-dimethyl-N'-(4-chlorophenyl-urea (monouron), N,N-dimethyl-N'-(3,4-dichlorophenyl)-urea (diuron),2,4-bis-(N',N'-dimethylureido)-toluene or 1,4-bis-(N',N'-dimethylureido)-benzene.

10. A fibre composite, impregnated with a mixture according to claim 1.

11. A crosslinked product obtained by hardening the mixture according to claim 1.

12. A prepreg obtained by impregnating a fabric with a mixture according to claim 1 and subsequent heating of the impregnated fabric until the reaction of the epoxide resin (a) with the amine (c) and the thiol (d) is complete, without simultaneous onset of the reaction of the epoxide resin (a) with the latent hardener (b).

13. A laminate obtained by complete hardening of the fibre composite according to claim 10 or of the prepreg according to claim 12.

14. A Hot-melt reactive adhesive obtained by heating a mixture according to claim 1 until the reaction of the epoxide resin (a) with the amine (c) and the thiol (d) is complete, without simultaneous onset of the reaction of the epoxide resin (a) with the latent hardener (b).

15. A mixture according to claim 2, wherein the difference between the reaction maxima is at least 50° C.

16. A mixture according to claim 6 wherein the latent hardener is dicyandiamide.

* * * * *